United States Patent [19]

Desch

[11] 4,182,168
[45] Jan. 8, 1980

[54] THRUST-TORQUE TRANSDUCER

[75] Inventor: John B. Desch, Brecksville, Ohio

[73] Assignee: Comptrol, Inc., Cleveland, Ohio

[21] Appl. No.: 938,645

[22] Filed: Aug. 31, 1978

[51] Int. Cl.$^2$ .............................................. G01L 3/10
[52] U.S. Cl. ..................................................... 73/140
[58] Field of Search ...................... 73/140, 134, 136 R

[56] References Cited

U.S. PATENT DOCUMENTS

| 2,921,298 | 1/1960 | Jackson | 73/140 X |
| 2,957,343 | 10/1960 | Hornbostel | 73/136 R |
| 3,100,989 | 8/1963 | Jones | 73/140 |
| 3,373,603 | 3/1968 | Chapman | 73/136 R |
| 4,089,216 | 5/1978 | Elias | 73/136 R |

FOREIGN PATENT DOCUMENTS

121786  8/1946  Australia ..................................... 73/140

*Primary Examiner*—Jerry W. Myracle
*Attorney, Agent, or Firm*—John F. Luhrs

[57] ABSTRACT

A thrust-torque transducer for measuring the end thrust or torque of a rotating shaft comprising a thrust bearing producing an axial displacement of the shaft from a no load or null position and an LVDT (Linear Voltage Differential Transformer) having a movable core axially aligned with, secured to and rotatable with the shaft producing an output signal corresponding to thrust or torque. A feedback loop may be incorporated in the transducer to maintain the shaft in the no load or null position from which a signal may be obtained corresponding to thrust or torque.

5 Claims, 4 Drawing Figures

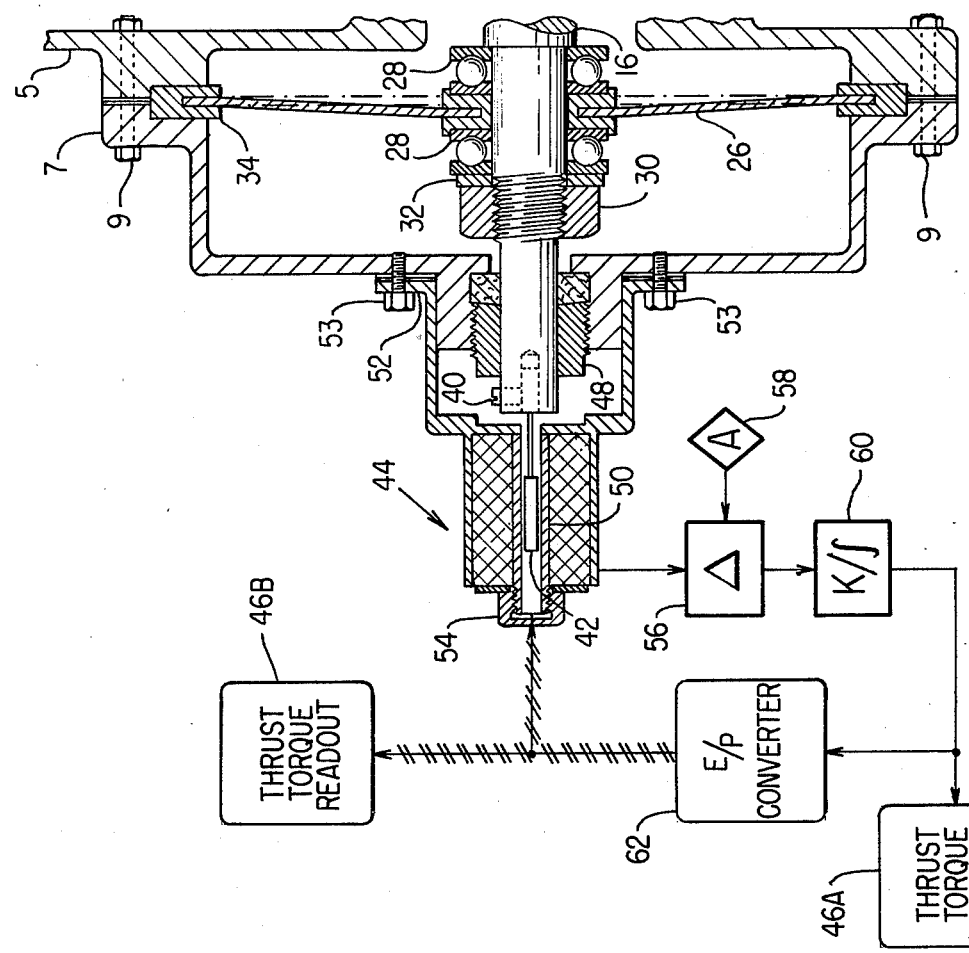
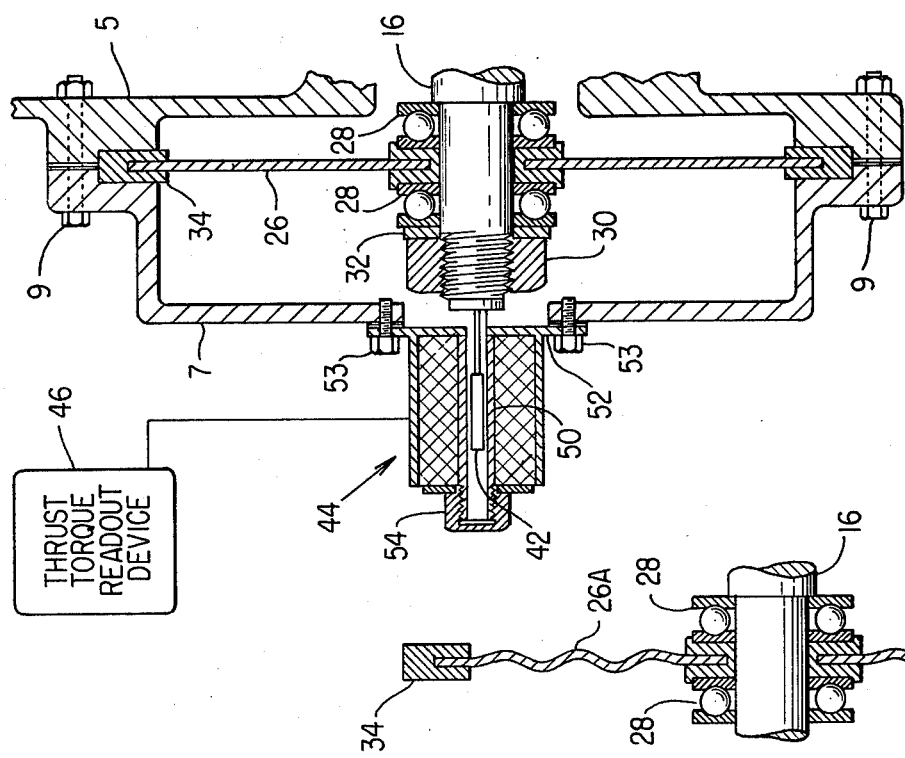

THRUST-TORQUE TRANSDUCER

This invention relates to a thrust or torque transducer for generating a signal corresponding to the output torque or axial thrust of a rotating shaft in machines such as speed reducers, gears reduction units, torque converters, turbines, jet engines and the like.

In accordance with one aspect of the invention a thrust bearing is provided producing an axial displacement of the shaft from a no load or null position corresponding to axial thrust.

Further in accordance with this invention the thrust bearing includes a spring diaphragm or bellows to produce the axial displacement of the shaft corresponding to the axial thrust.

Further in accordance with this invention a signal corresponding to the axial displacement is generated by an LVDT having a movable core affixed to the shaft and having a longitudinal axis of rotation concentric with the longitudinal axis of rotation of the shaft.

Further in accordance with another aspect of this invention the shaft is maintained in a null or neutral position by means of a feedback loop responsive to the output signal of the LVDT generating a force equal to, but in opposite sense to the axial thrust of the shaft.

These and other objectives of this invention will be apparent as the description proceeds in connection with the drawings in which:

IN THE DRAWINGS

FIG. 2 is a fragmentary view illustrating an alternate form of an element of the thrust bearing shown in FIG. 1.

FIG. 3 is a fragmentary view of a modification of the construction shown in FIG. 1.

FIG. 4 is a fragmentary view of a modified form of the invention incorporating a feedback loop.

DETAILED DESCRIPTION

Figure 1:
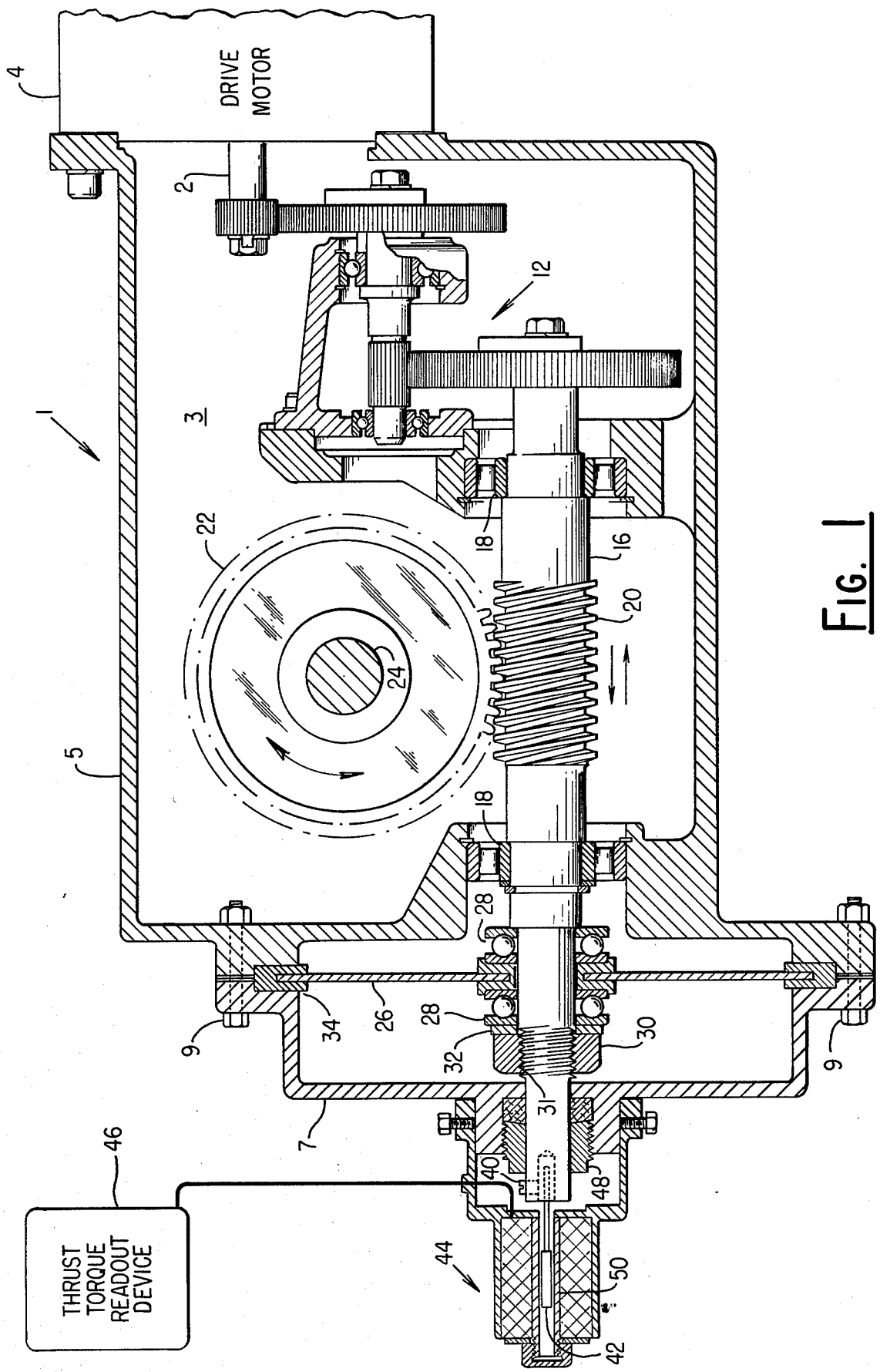
FIG. 1 is a side elevation view in cross section of a typical machine incorporating the thrust transducer of this invention.

While this invention may be used to generate an output signal corresponding to the axial thrust of a rotating shaft in a wide variety of machines such as, but not limited to, speed reducers, gear reduction units, torque converters, turbines, or jet engines for purposes of illustration it is shown as applied to the measurement of the end thrust of the worm in a speed reducer or gear reduction unit. Such a unit incorporates a relatively low torque input shaft rotatable at high speed by means of an electric, hydraulic, or pneumatic motor, which through reducing gears rotates a worm operatively connected to a relatively high torque slow speed output shaft. By measuring the end thrust of the worm of the output torque of the worm is inferentially determined.

Referring now to the drawings wherein like reference characters designate like or corresponding parts throughout the several views, there is shown a torque or speed converter generally indicated at 1, having a housing 3, comprised of a main section 5 and a removable end section 7 fastened to the main section by through bolts 9. The housing 3 is ordinarily partially or wholly filled with oil to provide lubrication of the internal mechanism.

An input shaft 2, rotatable at relatively high speeds by means of a drive motor 4, and which, through reducing gears generally indicated at 12, rotates at reduced speed a shaft 16, axially movable in forward and reverse directions from a null, neutral or no load position in bearings 18. Formed on the shaft 16 or fitted thereon is a worm 20, meshing with a worm wheel 22, secured to an output shaft 24, journaled in the housing 5. The output shaft 24 may be rotated in clockwise or counterclockwise directions by means of a reversing drive motor 4, or in one direction or the other by a single direction drive motor as dictated by the exigencies of a particular application. Further, as evident, the gear ratios may be varied as required to produce a desired ratio between the input and output speeds of the shafts 2 and 24.

As the output shaft 24 is loaded an axial thrust is produced on shaft 16 proportional to the torque output of shaft 24 and in sense dependent upon the direction of rotation. Thus, if shaft 24 rotates in a clockwise direction an end thrust is produced on the shaft 16 tending to move it to the right as viewed in FIG. 1 from the no load axial position and vice versa. In accordance with this invention, the shaft 16 is axially displaced in one direction or the other from its no load, null or neutral position an amount corresponding to the axial thrust which in turn corresponds to the torque output of the shaft 24.

As shown in FIG. 1, to produce an axial displacement of the shaft 16 corresponding to thrust, there is provided a thrust bearing comprising a spring diaphragm 26, clamped between ball bearings 28 by means of a nut 30, engaging threads 31 on the shaft 16, and a spacer 32. The outer circumference of the diaphragm 26 is carried in a shroud or holding ring 34 which in turn is clamped between mating phlange faces formed on the main section 5 and end section 7.

Alternate diaphragm forms may be employed to produce a desired relationship between thrust and axial displacement. In FIG. 2 there is shown, as an example, a rippled diaphragm 26 as an alternate form. Other diaphragm configurations may be found desirable to meet the exigencies of a particular application and may, if necessary, comprise a bellows made up of a plurality of diaphragms having contours giving a desired relationship between thrust and axial displacement such as a relatively large axial displacement with thrust, linearity of displacement with thrust and the like.

Axially aligned with and secured to the shaft 16 by means of a set screw 40 is the movable core 42 of an LVDT generally indicated at 44 which produces a signal corresponding to the axial displacement of the shaft 16 from a null, zero or no load position. The signal generated by an LVDT may, as will be apparent to those skilled in the art, be used for one or more purposes, such as recording, indicating and/or controlling. A readout device 46, responsive to the signal from the LVDT may be calibrated in thrust and/or torque units.

As shown in FIG. 1, a shaft seal 48 is provided, if necessary, to prevent deleterious fluids, which may be contained in the housing 3 from entering the LVDT. However, in the absence of such harmful materials being present, the shaft seal 48 may be eliminated and the modified construction shown in FIG. 3 advantageously employed. Therein the customary non-magnetic sleeve 50 is provided with a circumferential skirt 52 clamped pressure tight to the end section 7 by means of Screws 53 and provided with a pressure tight closure 54 at its outer end. Lubricating oil within the reducer is thus permitted to enter the sleeve 50, serving to lubricate the core as it rotates.

In FIG. 4 there is shown a further modification incorporating a feedback loop wherein a pneumatic pressure is generated from the output signal of the LVDT which acts to maintain the shaft 16 in the null, neutral or no load position. As shown, the output signal of the LVDT 44 inputs to a difference unit 56 in which it is compared with a signal generated in manually adjustable set point unit 58 and which generates an output signal corresponding to the difference in input signals. The output signal from difference unit 56 inputs to a proportional plus integral unit 60 and the output signal therefrom is converted into a proportional pneumatic pressure in E/P unit 62 which is admitted into the interior of nonmagnetic sleeve 50 and is effective against the end of shaft 16 to counterbalance the end thrust. The proportional plus integral unit 60 serves to vary the pneumatic output pressure from unit 62 as required to maintain the shaft 16 in the null, neutral or no load position. Thrust and/or torque readout can be obtained by means of a readout device 46A responsive to the output signal of proportional plus integral unit 60, or by a readout device 46B responsive to the output pressure of E/P converter 62.

To provide for operation of the reducer in clockwise or counterclockwise directions the diaphragm 46 may be prestressed so that under no-load condition, the shaft 16 is at an extreme of travel, to the left, for example, as shown in FIG. 4. Initially the set point signal is established to position the shaft 16 to a null position, as shown in dot-dash line in FIG. 4, thereafter an increase in thrust tending to cause a shaft displacement in one direction or the other will effect an immediate and proportionate change in the pressure effective on the end of the shaft 16, followed by a slow, continuing change until the shaft is restored to its null or neutral position.

I claim:

1. A transducer for measuring the end thrust or torque output of a rotating shaft, comprising, a thrust bearing operatively connected to said shaft permitting an axial displacement of said shaft from a null position proportional to end thrust, an LVDT having a core element and a coil element, means operatively connected to said shaft axially positioning one of said elements relative to the other and rotating one of said elements relative to the other to produce a first output signal corresponding to the axial displacement of said shaft from the null position and means maintaining said shaft in the null position comprising means responsive to said first output signal generating a feedback thrust on said shaft proportional to but in opposite sense to the end thrust on said shaft.

2. A transducer as set forth in claim 1 wherein said means generating a feedback thrust on said shaft includes, a difference unit generating a second output signal corresponding to the difference between said first output signal and a set point signal, and means responsive to said second output signal generating the feedback thrust on said shaft.

3. A transducer as set forth in claim 2 wherein said means responsive to said second output signal includes a proportional plus integral unit producing the output signal generating the feedback thrust.

4. A transducer as set forth in claim 3 wherein said first, second and output signal of the proportional plus integral unit are electrical signals and further including an electric to pneumatic converter unit responsive to said last named output signal and generating a proportional pneumatic pressure; and means for impressing the pneumatic pressure on said shaft to produce a feedback thrust thereon equal to but in opposite sense to the end thrust of said shaft.

5. Apparatus for measuring the output torque of a gear driven by the worm in a worm and gear speed reducer, comprising, a housing, radial bearings supported in said housing in which said worm is journaled permitting unrestrained axial movement of said worm in forward and reverse directions from a zero output torque position, a thrust bearing permitting axial displacement of said worm from said zero output torque position corresponding to the output torque of said driven gear, comprising, a spring diaphragm having its periphery secured to said housing, said thrust bearing operatively connecting said diaphragm to said worm and a LVDT supported by said housing in axial alignment with said worm having a core element secured to an rotatable with said worm to produce an output signal corresponding to the axial displacement of said worm from the zero output torque position.

* * * * *